(12) United States Patent
Shouji (10) Patent No.: US 6,715,880 B2
(45) Date of Patent: Apr. 6, 2004

(54) PROJECTOR DEVICE COMPRISING A ROD INTEGRATOR HAVING AT LEAST ONE NOTCH OR A PROTRUDED PORTION

(75) Inventor: Eisaku Shouji, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 34 days.

(21) Appl. No.: 10/187,607

(22) Filed: Jul. 3, 2002

(65) Prior Publication Data

US 2003/0007132 A1 Jan. 9, 2003

(30) Foreign Application Priority Data

Jul. 3, 2001 (JP) ........................................ 2001-202692

(51) Int. Cl.[7] ........................ G03B 21/14; G03B 21/20; G03B 21/28; G02B 7/18; G02B 5/04
(52) U.S. Cl. .............................. 353/20; 353/31; 353/33; 353/99; 353/102; 349/9; 359/831; 359/833; 348/744
(58) Field of Search .............................. 353/20, 33, 99, 353/102; 349/9; 359/831, 833; 348/744

(56) References Cited

U.S. PATENT DOCUMENTS 5,680,257 A * 10/1997 Anderson .................... 359/727
6,005,722 A * 12/1999 Butterworth et al. ........ 359/712
6,324,330 B1 * 11/2001 Stites .......................... 385/133
6,337,946 B1 * 1/2002 McGaffigan ................. 385/901
6,491,398 B2 * 12/2002 Takeuchi et al. ............... 353/31
6,505,939 B1 * 1/2003 Bierhuizen et al. ............ 353/94
6,513,937 B1 * 2/2003 Dehmlow ...................... 353/94
2001/0048562 A1 * 12/2001 Bartlett et al. ............... 359/636

FOREIGN PATENT DOCUMENTS

JP         2000-75407 A      3/2000      ........... G03B/21/14

* cited by examiner

Primary Examiner—Russel Adams
Assistant Examiner—Melissa J. Koval
(74) Attorney, Agent, or Firm—Sughrue Mion, PLLC (57) ABSTRACT

A projector device is provided which is capable of reducing its costs by making it possible to increase luminance of outgoing light from a rod integrator with an output from a light source being remained unchanged and by making it possible to achieve a compact illuminating optical system using a shortened total length of the rod integrator. Notches each having a predetermined angle or a convex portion is formed in a vicinity of a light incident face and in a vicinity of a light outgoing face of a rod integrator. A sloped line produced at an angle formed by one portion of each of the notches on the light incident side relative to a center line is approximately parallel to a light incident line produced at an angle formed by incident light relative to the center line.

17 Claims, 6 Drawing Sheets

PROJECTOR DEVICE COMPRISING A ROD INTEGRATOR HAVING AT LEAST ONE NOTCH OR A PROTRUDED PORTION

BACKGROUND OF THE INVENTION

1. Field of the Invention

The present invention relates to a projector device having an illuminating optical system and more particularly to the projector device using a micormirror device, for example, a DMD (digital micromirror device) as an image display device.

The present application claims priority of Japanese Patent Application No. 2001-202692 filed on Jul. 3, 2001, which is hereby incorporated by reference.

2. Description of the Related Art

Figure 11:
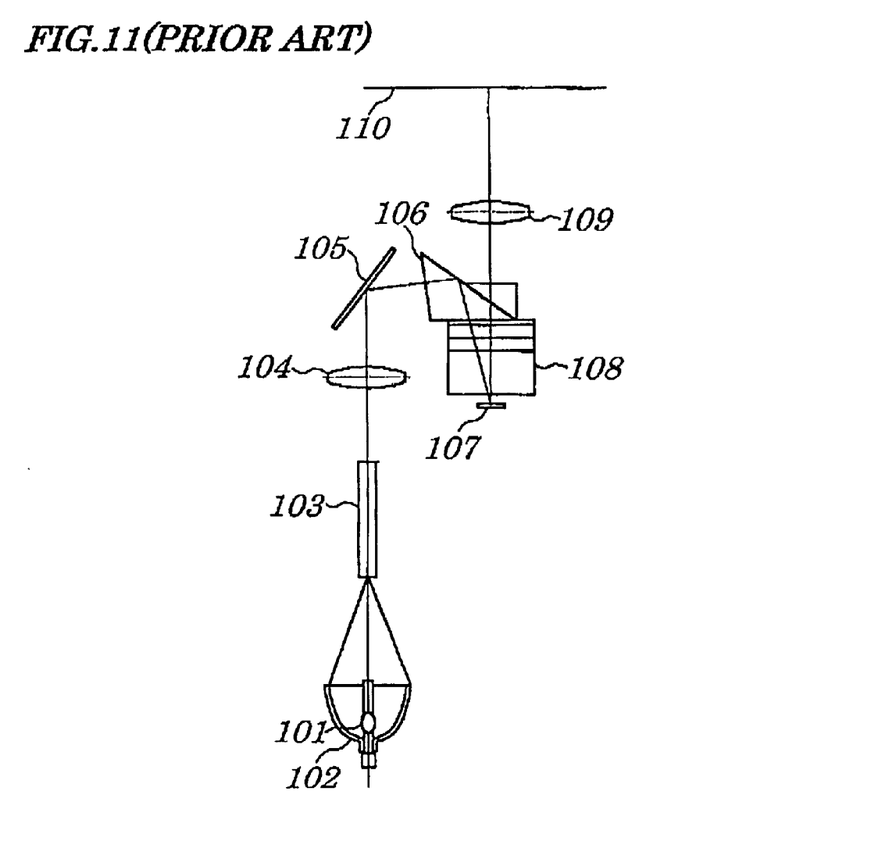
FIG. 11 is a schematic block diagram showing configurations of an illuminating optical system of a conventional projector device.

In recent years, in projectors, projecting devices or the like, a projector device having an illuminating optical device being equipped with a DMD is generally and widely used. A conventional projector device having such a DMD is described by referring to the below drawings. FIG. 11 is a schematic block diagram showing configurations of an illuminating optical system of the conventional projector device. As shown in FIG. 11, light emitted from a light source 101 is reflected by an elliptic plane mirror 102 and is then condensed by a rod integrator 103. The condensed light, after having gone out from the rod integrator 103, is transmitted through a relay lens 104, a reflecting mirror 105, a reflecting prism 106, and a color prism 108 to a DMD 107. The light reflected by the DMD 107 is transmitted again through the color prism 108 and the reflecting prism 106 to a projection lens 109 where the light is magnified and then is projected onto a screen 110.

Challenges presented by the conventional projector device (in seeking to project a clear image onto an entire projection screen) include reduction of nonuniformity in illumination by light from a light source and high intensity of an optical output. To meet these challenges, a prism-shaped transparent member, commonly called a rod integrator, is used to enable uniform application of the above condensed light.

Figure 12:
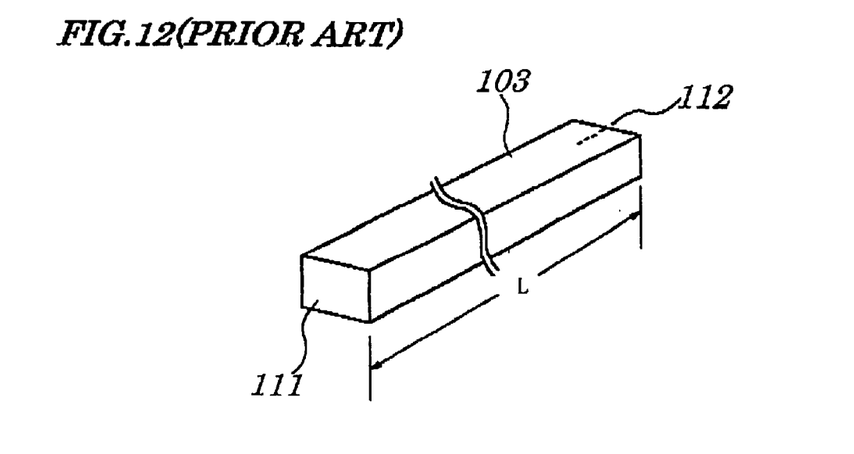
FIG. 12 is a perspective view showing a conventional rod integrator employed in the illuminating optical system.
Figure 13:
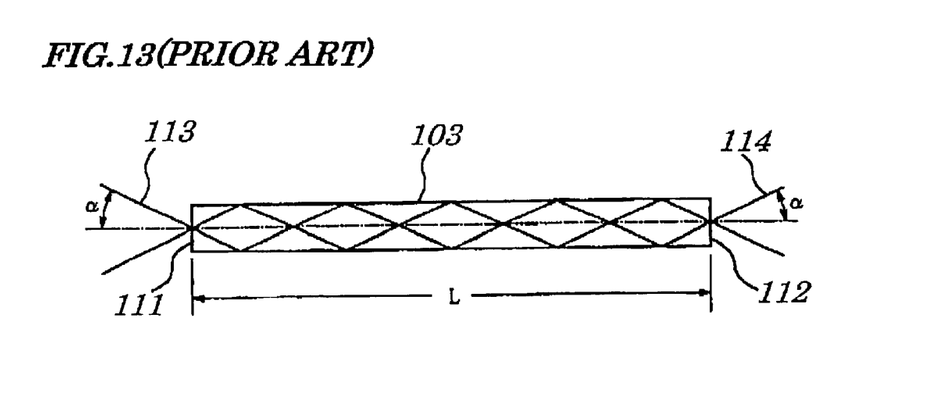
FIG. 13 is a diagram for illustrating configurations of the conventional rod integrator.

The rod integrator 103, as shown in FIG. 12, is fabricated by working heat-resistant silica glass having a length of "L" so as to have a prism-shaped configuration. Its cross section is rectangular and is similar to a shape of a projection screen and its one end serves as a light incident face 111 and its another end serves as a light outgoing face 112. Then, as shown in FIG. 13, incident light 113, which is condensed by the elliptic plane mirror 102 and is entered from the light incident face 111 at the one end of the rod integrator 103 at an incident angle of "α", repeats its total reflection on an inside face of the rod integrator 103 and reaches the light outgoing face 112 at another end of the rod integrator 103. The reached light is formed so to be a beam having a rectangular shape and goes out, as outgoing light 114, from the light outgoing face 112 at an outgoing light angle of "α" being the same as the incident angle.

By using such a rod integrator, nonuniformity in illumination can be eliminated or significantly reduced by repeated total reflection of the incident light along the lengthwise direction of the rod integrator, enabling outgoing illumination to possess high uniformity. However, mere use of the rod integrator does not always lead to acquirement of high luminance outgoing light. In order to obtain outgoing light with high luminance, the output from a light source has to be made high or the number of light sources has to be made plural (see Japanese Patent Application Laid-open No. 2000-75407). However, these methods cause an increase in power consumption. Moreover, in the case of the conventional rod integrator, in order to maintain uniformity of illumination, the number of times of total reflection of incident light within the rod integrator has to be increased and, therefore, as shown in FIG. 13, there is no choice but to increase a total length "L" of the rod integrator 103, which interferes with achievement of a compact illuminating optical system.

SUMMARY OF THE INVENTION

In view of the above, it is an object of the present invention to provide a projector device which is capable of reducing its costs by making it possible to increase the luminance of outgoing light from a rod integrator without a simultaneous change in the output from a light source, thereby making it possible to achieve a compact illuminating optical system using a rod integrator with a shortened total length.

According to a first aspect of the present invention, there is provided a projector device including:

an illuminating optical system having a rod integrator constructed of a transparent prism-shaped member and having a rectangular cross section to collect light emitted from a light source, a relay lens through which the light fed from the rod integrator passes, a reflecting mirror through which the light fed from the relay lens passes, a reflecting prism through which the light fed from the reflecting mirror passes, a color prism through which the light fed from the reflecting prism passes, a digital micromirror device to condense light fed from the color prism, wherein light reflected by the digital micromirror device, after having passed through the color prism, the reflecting prism and a projection lens, is projected onto a screen and wherein notches each having a predetermined angle or a convex portion having a predetermined angle is formed on a side in a vicinity of a light incident face and on a side in a vicinity of a light outgoing face.

In the foregoing, a preferable mode is one wherein, in the rod integrator, notches each having a predetermined angle are formed on a side in a vicinity of a light incident face and on a side in a vicinity of a light outgoing face.

Also, a preferable mode is one wherein, in the rod integrator, notches each having a predetermined angle are formed on a side in a vicinity of a light incident face and a convex portion having a predetermined angle is formed on a side in a vicinity of a light outgoing face.

Also, a preferable mode is one wherein, in the rod integrator, a convex portion having a predetermined angle is formed on a side in a vicinity of a light incident face and notches each having a predetermined angle are formed on a side in a vicinity of a light outgoing face.

Also, a preferable mode is one wherein, in the rod integrator, convex portions each having a predetermined angle are formed on a side in a vicinity of a light incident face and on a side in a vicinity of a light outgoing face.

Also, a preferable mode is one wherein, in the rod integrator, light having passed through the rod integrator is totally reflected at an angle formed by each of notches or a convex portion mounted on a side in a vicinity of a light outgoing face and wherein a light outgoing angle is made smaller than a light incident angle.

Also, a preferable mode is one wherein, in the rod integrator, a number of times of total reflection of incident light is increased by making large an incident angle of light entering the light incident face and a total length of the rod integrator is shortened to respond to the increased numbers of times of the total reflection of incident light.

Also, a preferable mode is one wherein, a sloped line produced at an angle formed by one portion of each of the notches on a light incident side is approximately parallel to incident light and a sloped line produced at an angle formed by another portion of each of the notches is approximately perpendicular to the incident light.

Also, a preferable mode is one wherein, in the rod integrator, a sloped line produced at an angle formed by the convex portion on a light incident side is approximately parallel to incident light.

Also, a preferable mode is one wherein, in the rod integrator, a light incident face of the convex portion formed on a light incident side which serves to take in incident light is formed so as to be larger than a rectangular cross section of a prism portion and so as to be rectangular.

Also, a preferable mode is one wherein, in the rod integrator, an angle formed by each of the notches on a light outgoing side or an angle formed by the convex portion on the light outgoing side is an angle which allows incident light to be totally reflected within the rod integrator and light coming out from the rod integrator to be effectively condensed at a predetermined light outgoing angle by the digital micromirror device.

Also, a preferable mode is one wherein, in the rod integrator, by condensing incident light lying off the rectangular light incident face out of incident light entering the rod integrator having notches on a light incident side using a face of one of the notches being approximately perpendicular to the incident light to increase an amount of incident light to be taken in, luminance of outgoing light is increased.

Furthermore, a preferable mode is one wherein, in the rod integrator, by condensing incident light lying off a rectangular light incident face having a same size as of a prism-shaped rectangular cross section out of incident light entering the rod integrator having a convex portion on a light incident side using a light incident face of the convex portion being formed so as to be larger than the rectangular light incident face to increase an amount of incident light to be taken in, luminance of outgoing light is increased.

With the above configurations, since notches each having a predetermined angle or a convex portion having a predetermined angle are formed in a vicinity of a light incident face and in a vicinity of a light outgoing face of the rod integrator, it is made possible for a rod integrator to take in incident light that has lain off a rectangular light incident face of the rod integrator out of light emitted from a light source to the rod integrator and therefore it is made possible to effectively use light that has been conventionally discarded, thus enabling improvement of luminance of the projector device without increasing an output of a light source lamp. Moreover, since a light incident angle of an incident light is made large, a number of times of total reflection is increased and, therefore, even if a total length of the rod integrator is reduced, uniformity of illumination similar to that exhibited by the lengthening of the rod integrator can be maintained. Further, even if the incident angle of the incident light is made large, light can go out at a more effective light outgoing angle to the DMD and, as a result, the illuminating system of the projector device of the present invention can be made compact. The above-described effects enable the reduction of costs for such projector devices.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Preferable modes of carrying out the present invention will be described in further detail using various embodiments with reference to the accompanying drawings.

First Embodiment

Figure 1:
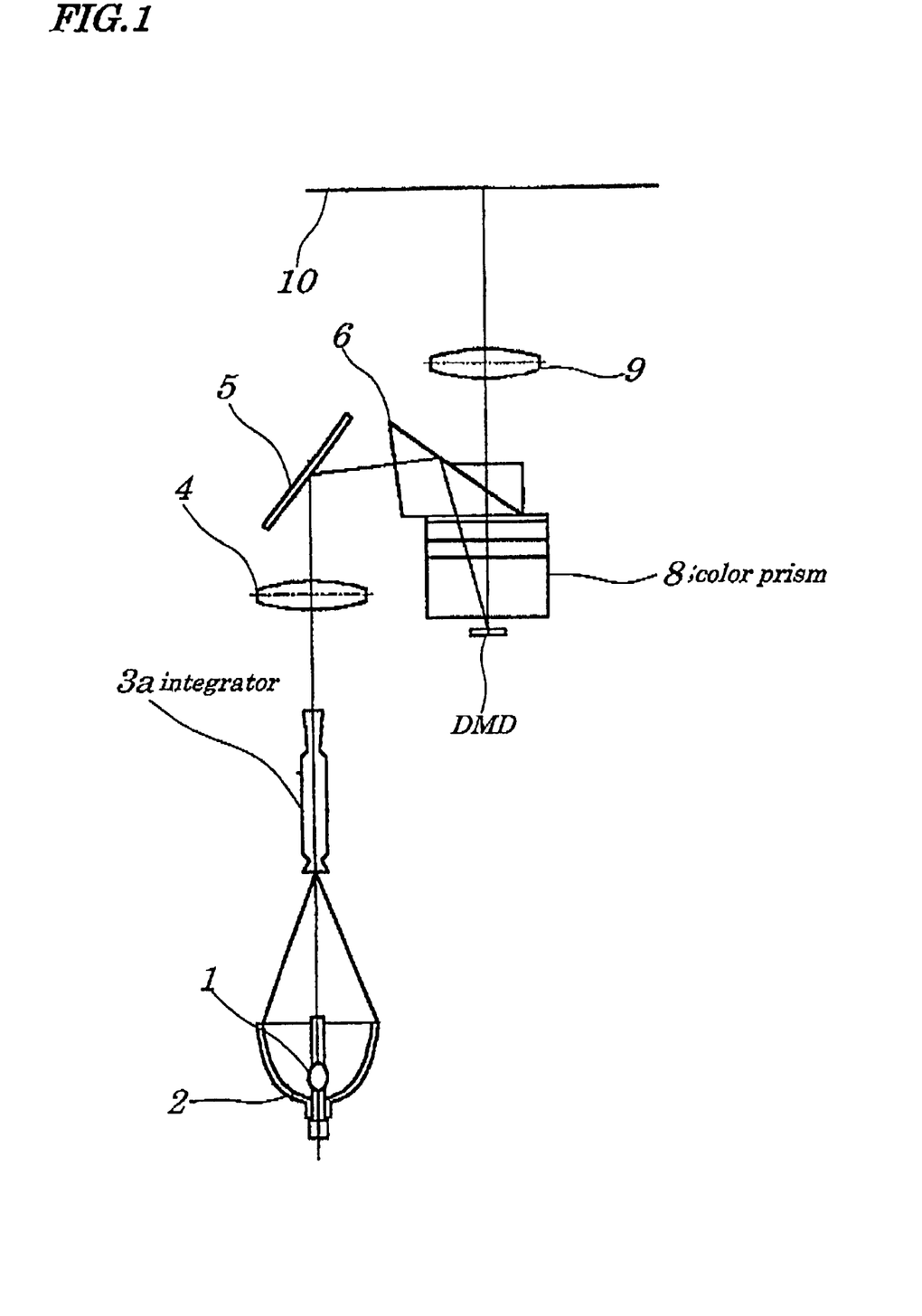
FIG. 1 is a schematic diagram showing configurations of an illuminating optical system of a first embodiment of the present invention.

FIG. 1 is a schematic diagram showing configurations of an illuminating optical system of a first embodiment of the present invention.

The projector device of the present invention, as shown in FIG. 1, has an elliptic plane mirror 2 serving as a reflecting mirror in its light source. In the embodiment, a Xenon lamp is used as the light source. As the light source, it is possible to use a high-intensity white light source such as a ultra-high pressure mercury lamp, a metal haloid lamp, a halogen lamp, or the like. Light from the light source 1 is condensed by a rod integrator 3a. The rod integrator 3a is fabricated by working heat-resistant glass such as a silica or a like so as to be prism-shaped. By incorporating the rod integrator 3a into the illuminating optical system in the projector device, illumination of illuminating luminous flux can be kept uniform. On sides in a vicinity of a light incident face and in a vicinity of a light outgoing face of the rod integrator 3a notches are formed, each having a predetermined angle so that an amount of incident light to be taken in can be increased and/or its total length can be shortened while uniformity of illumination is maintained. Moreover, configurations and operations of the rod integrator 3a will be explained in detail later by referring to the drawings.

The light that has passed through the rod integrator 3a then enters the relay lens 4. The relay lens serves to guide the light effectively into a DMD 7. A reflecting mirror 5 is placed at a specified angle relative to an optic axis in such a manner to have light enter in a vertical direction to a reflecting prism 6. The reflecting prism 6 serves to guide the incident light so that the light enters the DMD 7 at a specified angle, The reflecting prism 6 is constructed by combining two wedge-shaped prisms and has a tiny air gap at its junction face so that total reflection of light occurs therein.

In a color prism 8, the incident light is separated by colors including a red color, a green color, and a blue color and the light having one of the three colors enters each of the DMDs 7 for the red, green, and blue color. Moreover, in FIG. 1, the light having only one color out of the three colors is shown. The color prism 8 is constructed by combining three wedge-shaped prisms and has a coating, on each of its junction faces, which is used to transmit or reflect light having a specified color.

The DMD 7 has a function of having only light required for specified images be reflected toward a screen 10 and having unwanted light be reflected downward on the drawing in the color prism 8 to prevent the light being projected onto the screen 10. A projection lens 9 is used to project an image reflected by the DMD 7 onto the screen 10 in a magnified manner and has a focus adjusting function to perform adjustment of the focus of a projected image. Moreover, a zooming mechanism may be added to the illuminating system, which serves to change a size of a screen without changing a projection distance.

Figure 14:
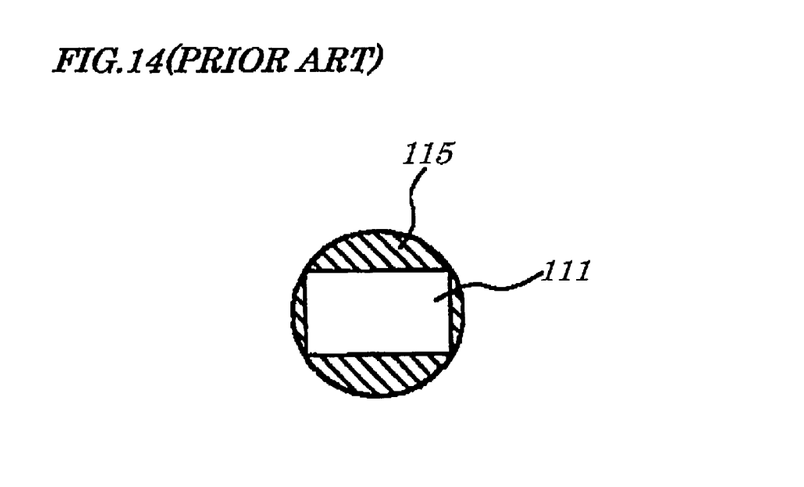
FIG. 14 is a front end view of the conventional rod integrator of FIG. 13.
Figure 15:
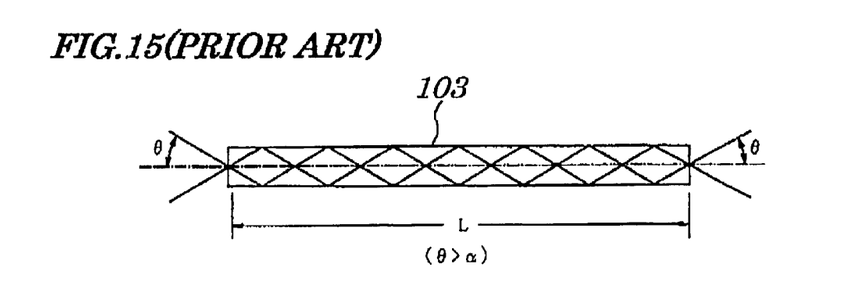
FIG. 15 is a diagram for explaining operations of the conventional rod integrator.

Next, operations of an embodiment of the rod integrator will be described in detail. As shown in FIGS. 12 and 14, conventionally, the light incident face 111 of the rod integrator 103 is rectangular, however, a cross section of luminous flux of the incident light is circular which has an intensity distribution in a direction of an axis. Therefore, as shown by a side view in FIG. 14, incident light 115 (portions shown by sloped lines) lying off the light incident face 111 has been discarded without being used as illuminating light. The present invention is featured by effective use of the light that has been conventionally discarded.

Moreover, in the conventional rod integrator 103, uniformity of illumination is kept by repeating the total number of reflections occurring therein. This uniformity can be improved by increasing the total number of times of repetition of reflection. An increase in the number of times of repetition of the total reflection can be achieved by further increasing the total length "L" of the rod integrator or by increasing an incident angle "θ" of the incident light from the light source (θ<α) without changing the total length "L." However, the increase in the total length leads directly to an increase in a total length of the illuminating optical system. Moreover, even if the incident angle "θ" of the incident light from the light source is increased,—the outgoing angle of the outgoing light from the rod integrator—to the DMD remains constant, and the luminance of illuminating light decreases by an amount of the outgoing light that has unnecessarily spread. To solve this problem, according to an embodiment of the present invention, an inventive application is used to increase the total number of repetitions of total reflections without increasing a total length of the rod integrator while simultaneously increasing the incident angle of the incident light from the light source and also concurrently converting outgoing light to illuminating light for effective use by the DMD without loosing luminance.

Then, again referring to FIG. 1, the light that has gone out from the rod integrator 3a is condensed by the relay lens 4 and is then reflected by the reflecting mirror 5 and enters the reflecting prism 6 in a vertical direction. The light having entered the color prism 8 is separated by colors including a red color, a green color, and a blue color and the light having one of the three colors is provided to each of the DMDs 7 for the red, green, and blue color. The relay lens 4 is so designed that the outgoing light from the rod integrator 3a is effectively condensed at a display area of the DUD 7. The DMD 7 reflects only the light required for specified images in a direction of an optic axis. The light reflected by the DMD 7 is synthesized while it passes through the color prism 8 again and a specified image made up of the synthesized light passes through the reflecting prism 6 described above. Then, the light is magnified by the projection lens 9 and forms an image onto the screen 10.

Figure 2:
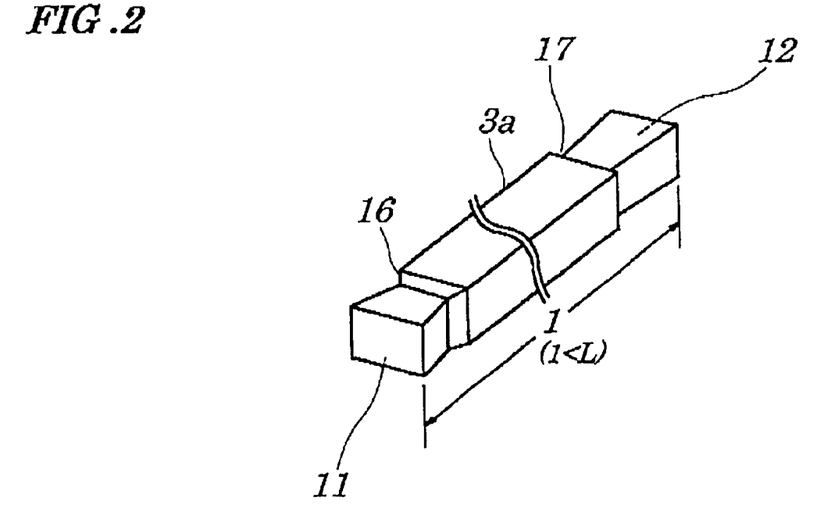
FIG. 2 is a perspective view showing configurations of a rod integrator employed in the illuminating system of the first embodiment of the present invention.
Figure 3:
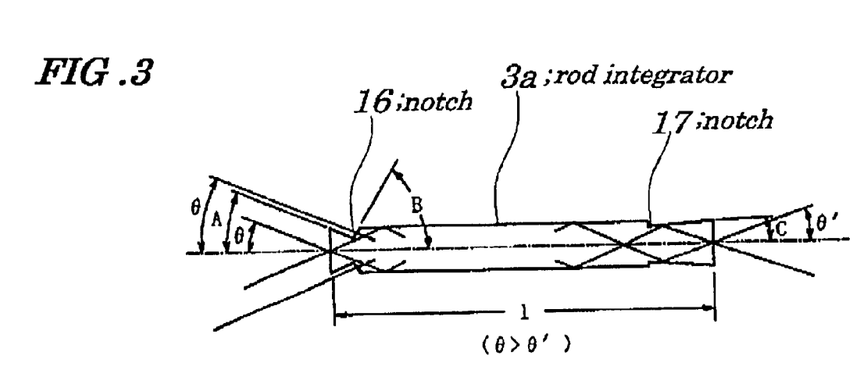
FIG. 3 is a diagram explaining the configurations of the rod integrator employed in the illuminating system of the first embodiment of the present invention.
Figure 4:
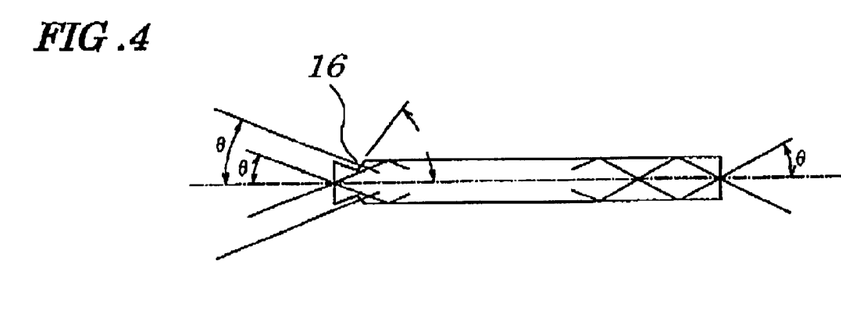
FIG. 4 is also a diagram explaining the configurations of the rod integrator employed in the first embodiment of the present invention.

The configurations of the rod integrator of the embodiment employed in the illuminating optical system will be described by referring to drawings. FIG. 2 is a perspective view showing configurations of the rod integrator employed in the first embodiment. FIG. 3 is a diagram further explaining the configurations of the above rod integrator. A method for constructing the rod integrator will be explained by referring to FIGS. 2 and 3. As shown in FIG. 2, first a prism-shaped member having a rectangular cross section and a length of 1 (1<L) is prepared which is used to form the rod integrator 3a. Then, a V-groove notch 16 is formed on each of four sides of the light incident face 11 of the prism-shaped member and a notch 17 is formed on each of four sides of the light outgoing face 12 in a similar manner.

The configurations of the rod integrator 3a formed in the manner as described above are further explained specifically by referring to FIG. 3. As shown in FIG. 3, a sloped line produced at an angle "A" formed by one portion of each of the notches 16 on the light incident side relative to a center line is approximately parallel to a light incident line produced at the light incident angle "θ" relative to the center line. Moreover, another sloped line produced at an angle "B" formed by another portion of each of the notches 16 on the light incident side relative to the center line is approximately perpendicular to the light incident line produced at the light incident angle "θ". This enables the incident light 15 lying off the rectangular light incident face 11 and that has been conventionally discarded to be taken in from a portion of each of the notches 16 each having an angle "B", which therefore serves to improve luminance of outgoing light. Moreover, an angle "C" formed by a sloped line provided by each of the notches 17 on the light outgoing side relative to the above center line is an angle at which the light having entered at the angle "θ" from the light incident side, after having been totally reflected repeatedly within the rod integrator 3a, is to be totally reflected so that the light goes out at an angle "θ'" (θ'<θ).

Figure 5:
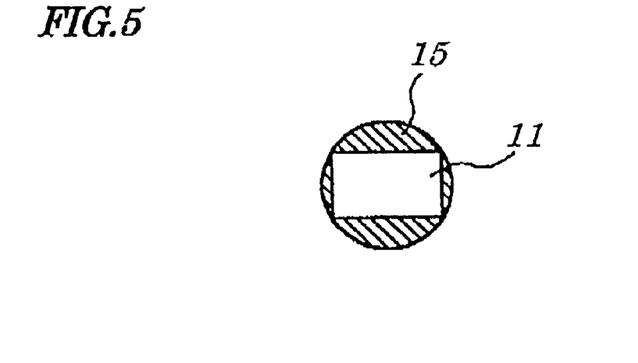
FIG. 5 is a front end view of the rod integrator of FIG. 3.

Now let it be assumed that each of the notches 16 is formed on the light incident side but no notch is formed on the light outgoing side. In this case, even if the number of times of the total reflection is increased by making large the light incident angle "θ" or even if an amount of light is increased by taking in the incident light 15 (which is shown by an sloped line in FIG. 5) from a portion of each of the notches 16 having the angle "B" on the light incident side, luminance becomes low since the light goes out with the light outgoing angle being remained the light incident angle "θ" and, as a result, the rod integrator does not perform its original function. Therefore, as shown in FIG. 3, to reduce the light outgoing angle that has to be effectively used in the DMD from "θ" to "θ'", each of the notches 17 on the light outgoing side is required.

Second Embodiment

Figure 6:
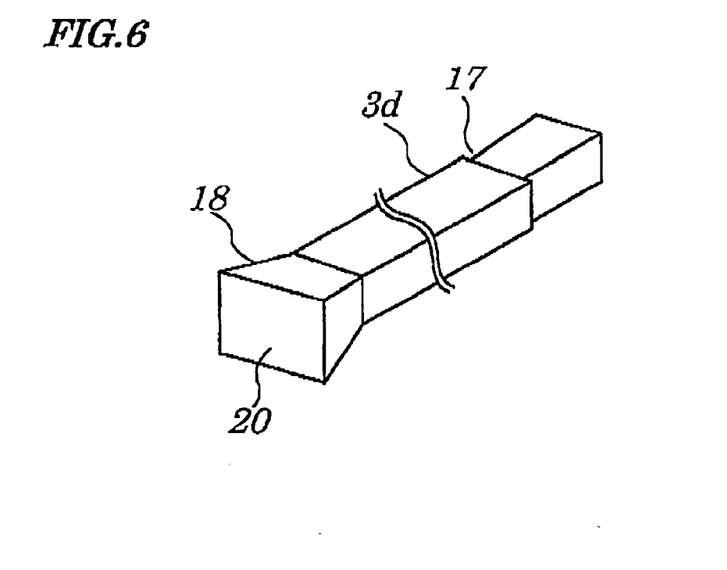
FIG. 6 is a perspective view showing configurations of a rod integrator according to a second embodiment of the present invention.
Figure 7:
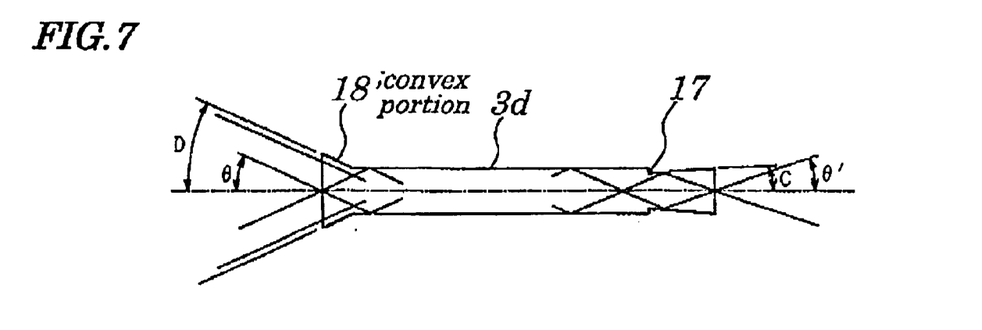
FIG. 7 is also a diagram illustrating configurations of the rod integrator according to the second embodiment of the present invention.
Figure 8:
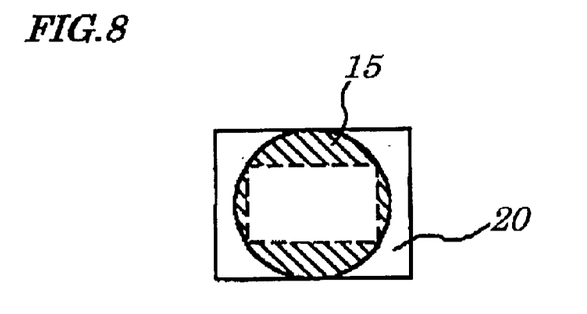
FIG. 8 is a front end view of the rod integrator of FIG. 7.

FIG. 6 is a perspective view showing configurations of a rod integrator according of a second embodiment of the present invention. FIG. 7 is also a diagram illustrating configurations of the rod integrator of the second embodiment. In the rod integrator 3b of the second embodiment, as shown in FIG. 6, a truncated pyramid-shaped convex portion 18 is formed on a light incident side of a prism-shaped member and notches 17 are formed on a light outgoing side. Moreover, as shown in FIG. 7, a sloped line produced at an angle "D" formed by one portion of the convex portion on the light incident side relative to a center line is approximately parallel to a light incident line produced at a light incident angle "θ" relative to the center line. As shown in FIG. 8, a light incident face 20 of the convex portion 18 is so formed as to be rectangular and a size of the rectangular light incident face 20 is large enough to contain incident light 15 lying off the light incident face 11 employed in the first embodiment and is larger than that of a cross section of a prism-shaped member employed in the second embodiment. This enables incident light that had been lain off to be taken in, thus increasing an amount of light and improving luminance of outgoing light. Moreover, as in the case of the first embodiment, notches 17 each having a notching angle "C" are formed on the light outgoing side so that light having entered at a light incident angle "θ" goes out at a light outgoing angle to "θ'".

Third Embodiment

Figure 9:
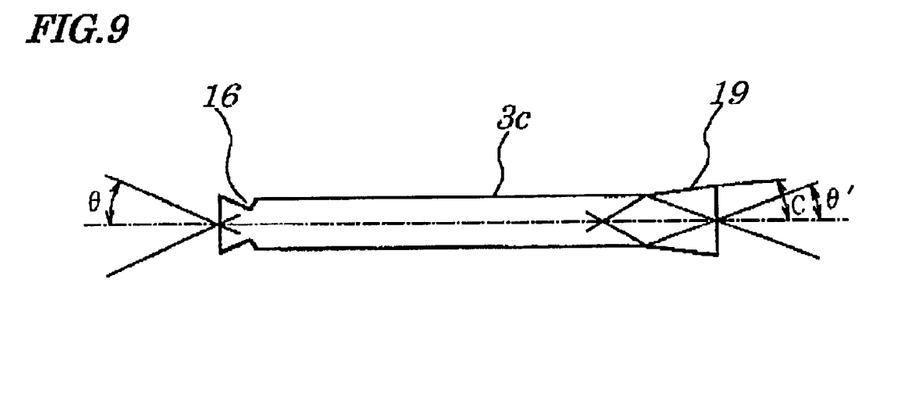
FIG. 9 is a diagram showing configurations of a rod integrator according to a third embodiment of the present invention.

FIG. 9 is a diagram showing configurations of a rod integrator according to a third embodiment of the present invention. In the rod integrator 3c, as shown in FIG. 9, notches 16 are similar to those described in FIG. 3 and are formed in a vicinity of a light incident face. A truncated pyramid-shaped convex portion 19 is formed in a vicinity of a light outgoing face. An angle "C" formed by a sloped line provided by the convex portion 19 on the light outgoing side relative to a center line is an angle at which the light having entered at an angle "θ" from a light incident side, after having been totally reflected repeatedly within a rod integrator 3c, is to be totally reflected so that the light goes out at an angle "θ'".

Fourth Embodiment

Figure 10:
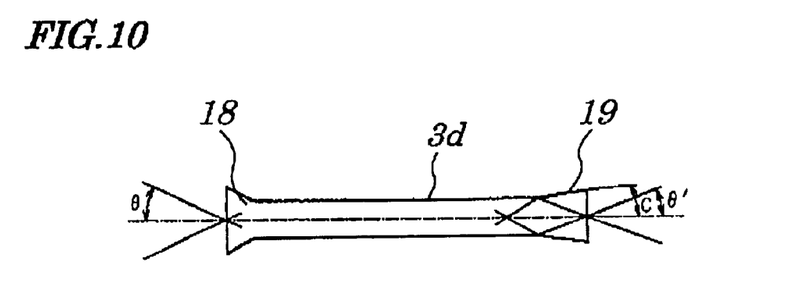
FIG. 10 is a diagram showing configurations of a rod integrator according to a fourth embodiment of the present invention.

FIG. 10 is a diagram showing configurations of a rod integrator of a fourth embodiment of the present invention. In the rod integrator 3d, as shown in FIG. 10, a-convex portion similar to that described in FIG. 7 is formed in a vicinity of a light incident face. A truncated pyramid-shaped convex portion 19 similar to that described in the third embodiment is formed in a vicinity of a light outgoing face. An angle "C" formed by a sloped line provided by the convex portion 19 on the light outgoing side relative to a center line is an angle at which the light having entered at an angle "θ" from a light incident side, after having been totally reflected repeatedly within a rod integrator 3d, is to be totally reflected so that the light goes out at an angle "θ'."

It is apparent that the present invention is not limited to the above embodiments but may be changed and modified without departing from the scope and spirit of the invention.

What is claimed is:

1. A projector device comprising:
an illuminating optical system having a rod integrator constructed of a transparent prism-shaped member and having a rectangular cross section to condense light emitted from a light source, a relay lens through which said light fed from said rod integrator passes, a reflecting mirror through which said light fed from said relay lens passes, a reflecting prism through which said light fed from said reflecting mirror passes, a color prism through which said light fed from said reflecting prism passes, a digital micromirror device to condense light fed from said color prism, wherein light reflected by said digital micromirror device, after having passed through said color prism, said reflecting prism and a projection lens, is projected onto a screen and wherein said rod integrator includes at least one notch or a protruded portion, said at least one notch or protruded portion formed on a lengthwise side or sides of said rod integrator in a vicinity of a light incident face and on a lengthwise side or sides in a vicinity of a light outgoing face, wherein the vertex of the angle of said at least one notch extends past the lengthwise plane of the rod integrator towards the center of the rod integrator, and wherein the vertex of the angle of said protruded portion is located substantially at the lengthwise plane of the rod integrator and wherein the angle of the vertex of the protruded portion is less than 180 degrees and wherein the base of a triangle formed by said vertex of the protruded portion is opposite said vertex of said protruded portion and extends in an oblique direction from said rod integrator, said base not breaking the lengthwise plane of the rod integrator.

2. The projector device according to claim 1, wherein said rod integrator includes more than one notch, said notches each having a predetermined angle and being formed on said side or sides in said vicinity of said light incident face and on said side or sides in said vicinity of said light outgoing face wherein the vertex of the angle of said notches extends past the lengthwise plane of the rod integrator towards the center of the rod integrator.

3. The projector device according to claim 1, wherein said rod integrator includes at least one notch and a protruded portion, said at least one notch having a predetermined angle formed on said side or sides in said vicinity of said light incident face and wherein the vertex of the angle of said at least one notch extends past the lengthwise plane of the rod integrator towards the center of the rod integrator; and further wherein said protruded portion has a predetermined angle formed on said side or sides in said vicinity of said light outgoing face.

4. The projector device according to claim 1, wherein said rod integrator includes at least one notch and a protruded portion, said protruded portion having a predetermined angle formed on said side or sides in said vicinity of said light incident face; and further wherein said at least one notch has a predetermined angle formed on said side or sides in said vicinity of said light outgoing face and wherein the vertex of the angle of said at least one notch extends past the lengthwise plane of the rod integrator towards the center of the rod integrator.

5. The projector device according to claim 1, wherein said rod integrator includes protruded portions, said protruded portions each having a predetermined angle formed on said side or sides in said vicinity of said light incident face and on said side or sides in said vicinity of said light outgoing face and wherein the vertex of the angle of each protruded portion is located substantially at the lengthwise plane of the rod integrator and wherein the angle of each vertex of each protruded portion is less than 180 degrees and wherein a base of a triangle is formed respectively opposite each vertex of each protruded portion, said base of each triangle extending in an oblique direction from said rod integrator, said base of each triangle not breaking the lengthwise plane of the rod integrator.

6. The projector device according to claim 1, wherein, in said rod integrator, light having passed through said rod integrator is totally reflected at an angle formed by said at least one notch or said protruded portion, said at least one notch or said protruded portion formed on said side or sides in said vicinity of said light outgoing face and wherein a light outgoing angle is smaller than a light angle incident to said light incident face.

7. The projector device according to claim 1, wherein, in said rod integrator, a number of times of total reflection of incident light is increased by increasing the size of said light incident angle while concurrently shortening the length of said rod integrator, thereby increasing the number of times that incident light is totally reflected within said rod integrator.

8. The projector device according to claim 2, wherein a sloped line produced at an angle formed by one portion of each of said notches on a side or sides in the vicinity of the light incident face is approximately parallel to incident light and a sloped line produced at an angle formed by another portion of each of said notches is approximately perpendicular to said incident light on said side or sides in the vicinity of the light incident face.

9. The projector device according to claim 4, wherein, in said rod integrator, a sloped line produced at an angle formed by said protruded portion on a side or sides in the vicinity of the light incident face is approximately parallel to incident light.

10. The projector device according to claim 4, wherein, in said rod integrator, a light incident face of said protruded portion formed on a light incident side which serves to take in incident light is formed so as to be larger than a rectangular cross section of a prism portion and so as to be rectangular.

11. The projector device according to claim 2, wherein, in said rod integrator, an angle formed by each of said notches on a light outgoing side or an angle formed by said protruded portion on said light outgoing side is an angle which allows incident light to be totally reflected within said rod integrator; and light coming out from said rod integrator is condensed at a predetermined light outgoing angle by said digital micromirror device.

12. The projector device according to claim 2, wherein, in said rod integrator, incident light is condensed by said notches, said incident light's angular range including the light outside of that angular range of light condensed by said rectangular light incident face wherein a portion of at least one of said notches is approximately perpendicular to said incident light, thereby increasing the amount of incident light taken in to said rod integrator, thereby increasing the luminance of outgoing light.

13. The projector device according to claim 4, wherein, in said rod integrator, incident light is condensed by said protruded portion, said incident light's angular range including the light outside of that angular range of light condensed by said rectangular light incident face, said protruded portion being formed so as to be larger than said rectangular light incident face, increasing the amount of incident light taken in to said rod integrator, thereby increasing the luminance of outgoing light.

14. A rod integrator wherein said rod integrator includes at least one notch or protruded portion, said at least one notch or at least one protruded portion formed on a lengthwise side or sides of said rod integrator in a vicinity of a light incident end and on a lengthwise side or sides in a vicinity of a light outgoing end, wherein the vertex of the angle of said at least one notch extends past the lengthwise plane of the rod integrator towards the center of the rod integrator, and wherein the vertex of the angle of said at least one protruded portion is located substantially at the lengthwise plane of the rod integrator and wherein the angle of the vertex of the at least one protruded portion is less than 180 degrees and wherein the base of a triangle formed by said vertex of the at least one protruded portion is opposite said vertex of said at least one protruded portion and extends in an oblique direction from said rod integrator, said base not breaking the lengthwise plane of the rod integrator.

15. The rod integrator of claim 14 including a plurality of notches located in the vicinity of both said light incident end and in the vicinity of said light outgoing end.

16. The rod integrator of claim 14 including a plurality of protruded portions, said plurality of protruded portions located in the vicinity of both said light incident end and in the vicinity of said light outgoing end.

17. The rod integrator of claim 14 wherein said at least one notch is formed at one of either said light incident end or said light outgoing end; and wherein said at least one protruded portion is located at the end of the rod integrator opposite to the end including said at least one notch.

* * * * *